(12) United States Patent
Lorrette et al.

(10) Patent No.: US 8,313,235 B2
(45) Date of Patent: Nov. 20, 2012

(54) METHODS FOR MANUFACTURING A CONTACT TEMPERATURE SENSOR AND METHOD FOR CALIBRATING SAID SENSOR

(75) Inventors: Christophe Lorrette, Villenave d'ornon (FR); Rene Pailler, Cestas (FR); Jean-Marc Goyheneche, Pessac (FR); Jean-Christophe Batsale, Beguey (FR)

(73) Assignee: Commissariat a l'Energie Atomique, Paris (FR)

( * ) Notice: Subject to any disclaimer, the term of this patent is extended or adjusted under 35 U.S.C. 154(b) by 538 days.

(21) Appl. No.: 12/526,863

(22) PCT Filed: Feb. 8, 2008

(86) PCT No.: PCT/EP2008/051566
§ 371 (c)(1),
(2), (4) Date: Sep. 21, 2009

(87) PCT Pub. No.: WO2008/101821
PCT Pub. Date: Aug. 28, 2008

(65) Prior Publication Data
US 2010/0118911 A1 May 13, 2010

(30) Foreign Application Priority Data
Feb. 12, 2007 (FR) ..................................... 07 53191

(51) Int. Cl.
*G01K 15/00* (2006.01)
*G01K 7/00* (2006.01)
(52) U.S. Cl. .......................................... 374/1; 374/183
(58) Field of Classification Search ............... 374/1, 183
See application file for complete search history.

(56) References Cited

U.S. PATENT DOCUMENTS
5,306,560 A * 4/1994 Wright et al. .................. 428/379
2009/0148699 A1 * 6/2009 Fryska et al. .................. 428/368

FOREIGN PATENT DOCUMENTS
JP 5 248964 9/1993

OTHER PUBLICATIONS

Lorrette, Christophe et al., "Deposition and characterization of hex-BN coating on carbon fibres using tris(dimethylamino)borane precursor", Journal of the European Ceramic Society, Elsevier, vol. 27, pp. 2737-2743, (2007).

Rogez, Jacques et al., "Mesure des temperatures, Techniques de l'Ingenieur (Measuring temperatures, Techniques of the Engineer)", vol. RC2, No. R2515, pp. 1-43, (1992).

(Continued)

*Primary Examiner* — Mirellys Jagan
(74) *Attorney, Agent, or Firm* — Oblon, Spivak, McClelland, Maier & Neustadt, L.L.P.

(57) ABSTRACT

A method for manufacturing a contact temperature sensor to be used at a temperature of use, including a) supplying a carbon fiber; b) heat treating of the fiber at a temperature higher than 800° C. and higher than the temperature of use; c) full layer depositing on the fiber, at a deposition temperature, an electrically insulating ceramic coating layer stable at the temperature of use, the ceramic material chosen among silica ($SiO_2$), zirconia ($ZrO_2$), and alumina ($Al_2O_3$); d) heat treating of the fiber, coated with the coating layer, at a temperature higher than the deposition temperature of the coating layer and higher than the temperature of use, or (c') full layer depositing on the fiber a first coating layer of silicon carbide; d') full layer depositing the first coating layer a second coating layer of boron nitride; e') heat treating the fiber thereby obtained at a temperature above the deposition temperatures and the temperature of use of the sensor.

12 Claims, 2 Drawing Sheets

OTHER PUBLICATIONS

Bonnier, Georges et al., "Thermistances et autres thermometres a semi-conducteurs, Techniques de l'Ingenieur (Thermistors and other semi-conductor thermometers, Techniques of the Engineer)", vol. RC3, No. R2580, pp. 1-16, & 1-2, (1991).

* cited by examiner

METHODS FOR MANUFACTURING A CONTACT TEMPERATURE SENSOR AND METHOD FOR CALIBRATING SAID SENSOR

TECHNICAL FIELD

The invention relates to methods for manufacturing a contact temperature sensor enabling the temperature of a material to be measured, a method for calibrating such a sensor and a method for using said sensor.

STATE OF THE PRIOR ART

It is important to be able to measure in an accurate manner the temperature of a medium (solid, liquid or fluid).

The main appliances for measuring temperature are as follows:
gas expansion thermometers,
vapour pressure thermometers,
liquid expansion thermometers,
solid expansion thermometers,
thermistors,
platinum, nickel or copper metal resistance thermometers,
germanium or carbon resistance thermometers,
thermoelectric couples,
optical pyrometers.

In gas expansion thermometers, the temperature is deduced from a variation in volume or pressure of a given mass of gas.

In vapour pressure thermometers, the temperature is deduced from a variation in the saturation vapour pressure of a liquid, which is independent of the volumes occupied by the liquid and the vapour (bulb containing a liquid in equilibrium with its vapour).

In liquid expansion thermometers, the temperature is deduced from a variation in volume of the liquid. In practice, the expansion difference between a liquid and its casing is measured.

In solid expansion thermometers, the temperature is deduced from a variation in length of a solid. In practice, the difference in elongation between the rod and the support or between two welded strips of different nature (bimetallic strip) is measured.

In thermistors, the temperature is deduced from a variation in the electrical resistance of a semi-conductor body.

In platinum, nickel or copper metal resistance thermometers, the temperature is deduced from a variation in the electrical resistance of a metallic conductor body.

In germanium or carbon resistance thermometers, the temperature is deduced from a variation in the electrical resistance of a non-metallic conductor body.

In thermoelectric couples, the temperature is deduced from the electromotive force generated in a circuit comprising two conductors of different nature.

In optical pyrometers, the temperature is deduced from the infrared radiation emitted by the medium.

The temperature range specific to each thermometer is limited.

Many thermometers operate between −100° C. and 200° C., but the further away from this temperature range, the more limited the choice (see document [1]).

For a temperature ranging from 500 to 800° C., thermoelectric couples are the best suited measurement devices, whereas pyrometers offer great ease in the continuous industrial control of temperature.

Above 800° C., optical pyrometers must be favoured, although thermoelectric couples based on precious metals can be used up to 1500° C. The use of refractory metal couples, possible in practice up to 2400° C., poses serious problems of maintenance and safety of use.

Typically, the use of thermometers based on the relation between the electrical resistance and the temperature (platinum, nickel or copper metal resistance thermometers and germanium or carbon resistance thermometers) does not exceed 1000° C. For germanium or carbon resistance thermometers in particular, the field of use is guided by the ease of measuring at low temperatures and the drawback of the sensitivity to the thermal cycles of germanium or carbon for high temperatures. Thus, typically, the field of use of a carbon thermometer extends from 0.05 K to 300 K, in other words from −273° C. to 27° C. (see document [2]).

In concrete terms, a reliable measurement of temperature beyond 1500° C. can only be carried out by optical pyrometry, without contact with the medium whose temperature it is desired to determine. Indeed, although some thermoelectric couples based on precious metals may still be employed for measurements through contact at these temperature levels, their price remains very high, their calibration uncertain and their drift as a function of the atmosphere and the nature of the medium make them difficult to use. However, the drawbacks of pyrometric measurement are, on the one hand, its limitation to surface temperatures and, on the other hand, its calibration, which has to take into account the emissivity of the targeted body and the transmittivity of the intermediate medium (gas, smoke, portholes, etc.) traversed by the detected radiant flux.

The object of the invention is to propose a contact temperature sensor capable of measuring the temperature of a medium that can have a temperature ranging up to 800° C. and above.

Moreover, it is known, through the works of C. Lorette et al. (see document [3]), that it is possible to cover a carbon fibre with a coat of hexagonal boron nitride by low pressure chemical vapour deposition (LPCVD).

DESCRIPTION OF THE INVENTION

This aim is achieved by a method for manufacturing a contact temperature sensor intended to be used at a temperature of use $T_U$, said sensor being able to withstand a temperature higher than 800° C., the method comprising the following steps:

supply of a carbon fibre of length L and of micrometric diameter, heat treatment of the fibre at a temperature $T_1$ higher than 800° C. and higher than the temperature $T_U$ of use of the sensor, full layer deposition on the fibre, at a deposition temperature $T_D$, of a coating layer of electrically insulating ceramic material and stable at the temperature of use $T_U$ of the sensor, the ceramic material being chosen among silica ($SiO_2$), zirconia ($ZrO_2$) and alumina ($Al_2O_3$), heat treatment of the fibre, coated with the coating layer, at a temperature $T_2$ higher than the deposition temperature $T_D$ of the coating layer and higher than the temperature of use of the sensor.

Advantageously, the temperature $T_1$ and the temperature $T_2$ are higher than a temperature $T_E$ known as "calibration limit temperature", said calibration limit temperature $T_E$ being higher than the temperature $T_U$ of use of the sensor.

Advantageously, the temperature $T_1$ is higher than the temperature $T_2$.

In this manufacturing method, the ceramic material is chosen among silica ($SiO_2$), zirconia ($ZrO_2$) or alumina ($Al_2O_3$). The choice of the material is made as a function of the temperature of use of the sensor (and if necessary the calibration limit temperature of the sensor, if the sensor has to be calibrated) and the melting temperature of the ceramic material, because the material has to be able to withstand this temperature of use (and if necessary this calibration temperature). The ceramic material chosen has a low electrical conductivity so that the electrical resistance of the material once deposited on the fibre is sufficient (in other words sufficiently high compared to that of the fibre) so that the carbon fibre can be considered as being electrically insulated.

The invention also relates to a method for manufacturing a contact temperature sensor intended to be used at a temperature of use $T_U$, said sensor being able to withstand a temperature higher than 800° C., the method comprising the following steps:

supply of a carbon fibre of length L and of micrometric diameter, heat treatment of the fibre at a temperature $T_1$ higher than 800° C. and higher than the temperature $T_U$ of use of the sensor, full layer deposition on the fibre, at a deposition temperature $T_{D1}$, of a first coating layer of silicon carbide, full layer deposition on the first coating layer, at a deposition temperature $T_{D2}$, of a second coating layer of boron nitride, heat treatment of the fibre thereby obtained at a temperature $T_2$ above the deposition temperatures $T_{D1}$ and $T_{D2}$ and the temperature of use $T_U$ of the sensor.

Advantageously, the temperature $T_1$ and the temperature $T_2$ are higher than a temperature $T_E$ known as "calibration limit temperature", said calibration limit temperature $T_E$ being higher than the temperature $T_U$ of use of the sensor.

Advantageously, the temperature $T_1$ is higher than the temperature $T_2$.

It should be noted that in the above two manufacturing methods, the full layer deposition may be carried out by chemical vapour deposition (CVD) and the carbon fibre may be an XN05 type fibre.

The temperature sensor, when it is calibrated (for example according to the calibration method described below), may be used to measure temperatures with precision.

The temperature sensor thereby formed may be used to measure a temperature variation.

The sensor according to the invention may be used at temperatures lower than 800° C., but the advantage of the sensor compared to contact temperature sensors of the prior art is that it enables temperatures extending beyond 800° C. to be measured.

Another advantage of the sensor according to the invention is that it enables the temperature within a solid, liquid or gaseous medium to be measured, said medium being able to have a temperature higher than 800° C. The sensor also has the advantage of being re-usable many times.

The invention also relates to a method for calibrating the sensor obtained according to one or the other of the aforementioned manufacturing methods. This calibration method comprises the uniform heating of the sensor according to a temperature ramp by passing an electrical current in the fibre of the sensor until a calibration limit temperature $T_E$ is reached, and the simultaneous measurement of the temperature and the resistance of the fibre of the sensor by means of measurement means so as to determine the calibration function $F_E$ linking the temperature $T_C$ (K) of the sensor to its electrical resistance $R_C(\Omega)$ according to the formula $R_C(\Omega) = F_E \cdot T_C(K)$, the calibration temperature $T_E$ being higher than the temperature of use of the sensor and lower than the heat treatment temperatures $T_1$ and $T_2$.

The uniform heating of the fibre is achieved by heating in a slow and progressive manner.

The invention also relates to a method for measuring the temperature of a material to be tested by means of a contact temperature sensor obtained according to one or the other of the aforementioned manufacturing methods. The measuring method comprises bringing the fibre of the sensor into contact with a surface of the material to be tested, heating the fibre of the sensor by means of said material to be tested with which the fibre is in contact (propagation of heat from the material to the fibre) and measuring the resistance $R_C$ of the fibre to deduce its temperature $T_C$ via the calibration function $F_E$ of the sensor determined according to the calibration method described above.

Finally, the invention also relates to an element consisting of a solid material, characterised in that it incorporates a sensor obtained according to one or the other of the manufacturing methods described above, the ends of the sensor being accessible from the exterior of the element so as to be able to connect the sensor to an electrical supply source. Thus, the sensor is integrated in the material and it can measure the temperature of the material. The sensor may have been calibrated, for example according to the calibration method described above, before being incorporated in the material.

BRIEF DESCRIPTION OF DRAWINGS

The invention will be better understood and other advantages and particularities will become clear on reading the description of embodiments, given purely by way of non limiting example, and by referring to the appended figures in which.

DETAILED DESCRIPTION OF SPECIFIC EMBODIMENTS

Figure 1:
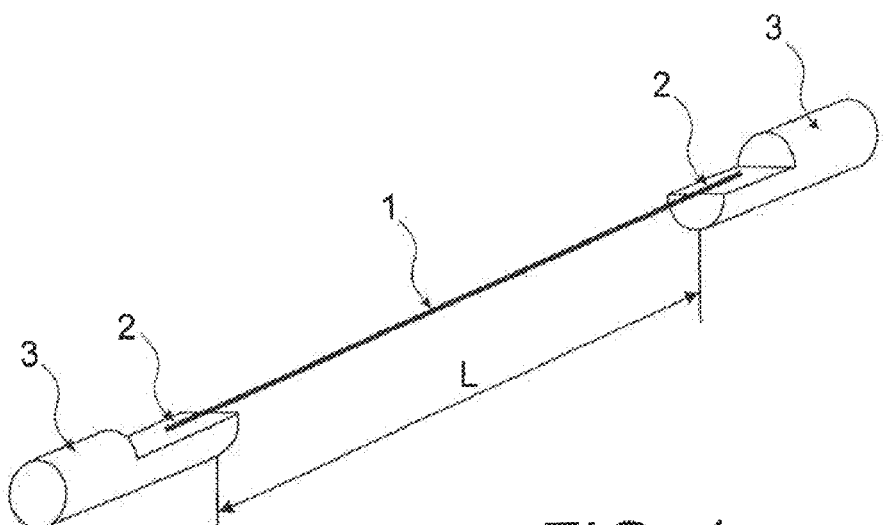
FIG. 1 is a schematic diagram of the sensor and its gripping means.

The sensor according to the invention comprises a carbon fibre of micrometric diameter (the diameter is between several micrometers and several tens of micrometers) and of millimetric length. The extremely reduced transverse dimension of the fibre leads to obtaining, on the one hand, a uniform temperature in the section of the sensor and, on the other hand, response times estimated at several microseconds (the response time is obtained according to the following formula: $t \approx 3 \cdot \rho \cdot c_p \cdot R^2 / \lambda$, which gives response times of around several microseconds for a thermal conductivity $\lambda$ of around 80 $W \cdot m^{-1} \cdot K^{-1}$, a density $\rho$ of around 2000 $kg \cdot m^3$, a heat capacity $c_p$ of around 2200 $J \cdot kg^{-1} \cdot K^{-1}$ and a fibre radius R of around 5 µm).

To measure the temperature from the sensor according to the invention, the fibre is placed in contact with the medium (liquid, solid, gaseous) to be measured, the variation in electrical resistance in the fibre is measured and from this measurement the average temperature of the fibre is deduced thanks to a temperature/resistance calibration carried out beforehand. Since the temperature of the fibre is assumed to be identical to that of the medium with which it is placed in contact, the temperature of the medium is thereby obtained.

Unlike the sensors of the prior art, the sensor according to the invention may be used to measure materials at temperatures above 800° C., and even at very high temperatures (extending beyond 1500° C.). Indeed, thanks to the heat treatment of the carbon fibre, the sensitivity of the fibre to the thermal cycles of carbon for high temperatures is eliminated.

The method for manufacturing a temperature sensor according to the invention, comprising a carbon fibre covered with a layer of silicon carbide and a layer of boron nitride, will now be detailed below.

The quality of the sensor obtained depends (i) on its thermochemical stability, (ii) its electrical insulation in the case of a measurement within a conductive medium (solid, liquid or gas), (iii) the mechanical strength of the fibre, which assures the solidity of the sensor and (iv) the sensitivity of the electrical resistance of the fibre to temperature. These four criteria condition the manufacturing method.

The method for manufacturing the sensor comprises several steps.

The first step consists in choosing a carbon fibre which, once heat treated, preferably at very high temperature, has both suitable mechanical properties and a high sensitivity of its electrical resistivity to temperature.

To form the sensor, it has been chosen to use an XN05 fibre. This is an isotropic pitch-based carbon fibre produced by Nippon Graphite Fiber, having an average diameter of 10 μm.

The second step consists in cutting the fibre to length L, then associating it preferably with a gripping device, made of electrically conductive material or simply covered with an electrically conductive material, which will make it possible on the one hand to easily handle the sensor and on the other hand to form simply the electrical connections. It is desirable that the fibre is made definitively integral with this gripping device. The fibre may be fixed to the gripping device at its ends by means of carbon adhesive. The ends of the sensor may for example be fixed to jaws on which will be formed the electrical connections.

The choice of the length L of the fibre is determining since it sets both the dimension of the sensor, in other words the geometric area concerned by the temperature measurement, but also its electrical resistance $R_C$ defined by the following relation:

$$R_C = \rho_{EC} \frac{L}{S}$$

where $\rho_{EC}$ (Ω·m) represents the electrical resistivity of the fibre and S (m²) its section.

In this embodiment example, a length L of around 50 mm and gripping devices consisting of two carbon jaws have been chosen. An assembly diagram is presented in FIG. 1: the sensor 1 of length L has its ends 2 which are bonded to two jaws 3, the jaws 3 facilitating the gripping of the sensor and serving as electrical connections to the sensor.

The third step consists in heat treating the fibre at a temperature $T_1$, higher than the temperature of use $T_U$ of the sensor, higher than the calibration limit temperature $T_E$ and higher than the elaboration temperature $T_F$ of the fibre (in other words higher than all of the temperatures that will be imposed on it subsequently), in order to assure its thermochemical stability. The fibre chosen for the elaboration of the sensor has undergone, during its manufacture, a heat treatment of several minutes at $T_F$=800° C. (manufacturer's data). It is thus chosen to thermally stabilise the fibre at a temperature $T_1$ higher than the temperatures $T_E$, $T_U$ and $T_F$, for example at $T_1$=2200° C.

The fourth step consists in carrying out an electrical insulation deposition on the fibre. To produce the sensor, it has been chosen to use boron nitride (BN), because it is a good thermal conductor (thermal conductivity of around 60 W·m$^{-1}$·K$^{-1}$ in the direction parallel to the sheets and around 2 W·m$^{-1}$·K$^{-1}$ in the direction perpendicular to the sheets for a layer of crystallised boron nitride in the form of sheets), a poor electrical conductor (electrical resistivity around $10^8$ Ω·m in the direction parallel to the sheets and around $10^6$ Ω·m in the direction perpendicular to the sheets for a layer of crystallised boron nitride in the form of sheets) and it is stable at very high temperature (its melting temperature is situated around 2600-2800° C.)

Other types of deposition may also be envisaged, providing that they meet these two latter conditions. Although it remains desirable, the good thermal conductor character is not indispensable because the diameter of the sensor is small (ten or so micrometers) compared to the spatial variation in temperature to measure.

The choice of the type of deposition is also linked to its interaction if any with the carbon of the fibre. To offset this drawback in the case of a deposition of boron nitride, a layer of silicon carbide (SiC) is inserted between the carbon fibre and the layer of boron nitride in order to, on the one hand, prevent the diffusion of carbon into the layer of boron nitride and, on the other hand, prevent the reaction $NH_3+C\rightarrow HCN+CH_4$ taking place because it would degrade the fibre during the deposition of the boron nitride.

The phenomenon of diffusion of carbon into the layer of boron nitride is irreversible and is favoured by a high temperature level. This diffusion of carbon leads to degrading the electrical insulation properties of the boron nitride deposition.

It is particularly important to protect the fibres from the reaction $NH_3+C\rightarrow HCN+CH_4$ if they have a disordered texture. In the case of the XN05 fibre treated at $T_1$=2200° C., this phenomenon is very little present. Consequently, it is not necessary to deposit silicon carbide to protect the carbon of the fibre from the reaction $NH_3+C\rightarrow HCN+CH_4$. Only the temperature of use level of the sensor will be determining to know whether or not a layer of silicon carbide is necessary.

The insulation deposition on the surface of the fibre may be carried out from a liquid precursor by the chemical vapour deposition technique, according to the conditions of temperature, pressure, flow rate and exposure time defined as a function of the nature of the coating and the experimental device. For carbon fibres coated with silicon carbide and boron nitride, the following conditions were used:

Deposition of Silicon Carbide

Precursor: tetramethylsilane (TMS)
Reactant: hydrogen ($H_2$)
Carrier: hydrogen ($H_2$)
Deposition temperature ($T_D$): 1100° C.
Pressure: 0.3 bar
TMS flow rate: 100 sccm
$H_2$ flow rate: 8 sccm
Time: 15 minutes to obtain a deposition thickness of around 500 nm.

Deposition of Boron Nitride

Precursor: tridimethylaminoborane (TDMAB)
Reactant: ammonia ($NH_3$)
Carrier: hydrogen ($H_2$)
Temperature ($T_D$): 1300° C.
Pressure: 0.3 bar
$NH_3$ flow rate: 100 sccm
$H_2$ flow rate: 15 sccm
Time: adjustable as a function of the desired deposition thickness.

Figure 2:
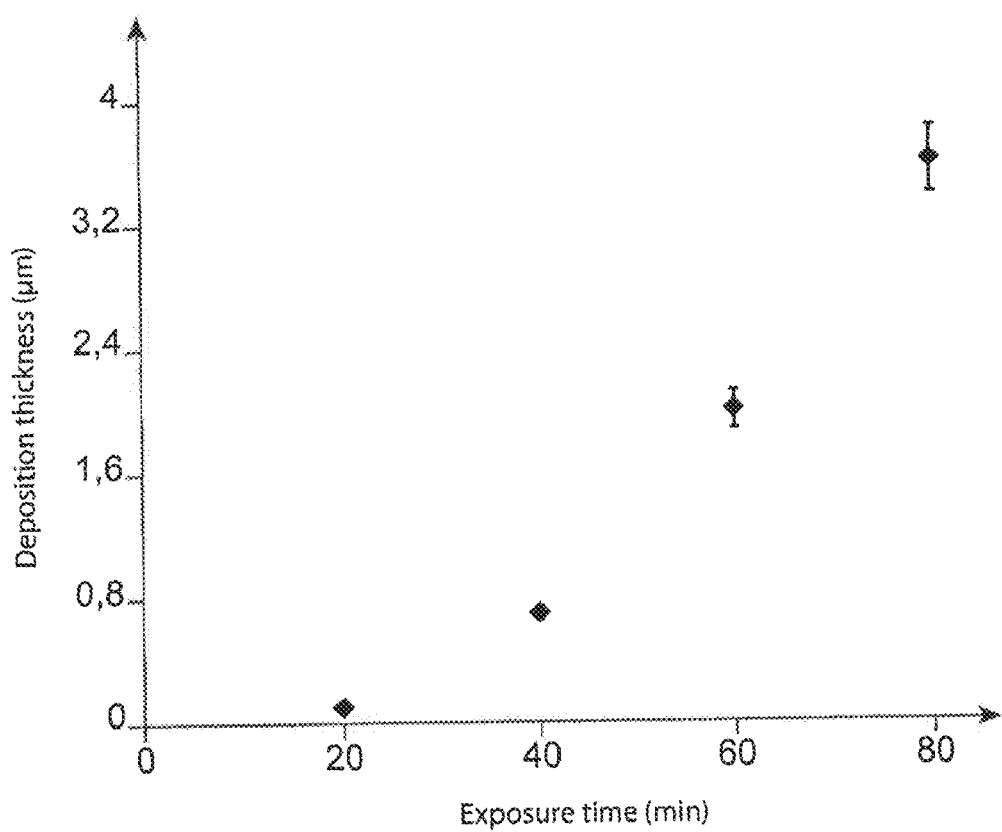
FIG. 2 represents the variation in the thickness of a deposition layer as a function of the exposure time of the fibre of the sensor according to the invention.

In FIG. 2, a graph illustrating the deposition thickness obtained as a function of the exposure time is represented. It may be seen that the longer the exposure time, the higher the thickness of the deposition layer.

In this embodiment example, a layer of silicon carbide having a thickness less than 500 nm, then a layer of boron nitride having a thickness between 500 and 2500 nm have been deposited. The thickness of the layer of boron nitride is chosen so as to assure a good electrical insulation of the fibre.

In this example, we have used an XN05 type fibre and a deposition of SiC and a deposition of BN. It is obviously understood that other types of carbon fibres and other kinds of ceramic deposition may be envisaged. Thus, as described in this application, the sensor may be a carbon fibre covered with a coating layer made of electrically insulating ceramic material and stable at the temperature of use $T_U$ of the sensor, the ceramic material being chosen among silica ($SiO_2$), zirconia ($ZrO_2$) and alumina ($Al_2O_3$).

The fifth step in the manufacture of the sensor consists in thermally treating the assembly consisting of the fibre and the insulating deposition up to a temperature higher than the calibration temperature. In this embodiment example, the sensor has been thermally stabilised by heating it to a temperature $T_2=1800°$ C.

As has been seen above, determining temperature levels must be taken into account during the elaboration of the sensor:
 the elaboration temperature of the carbon fibre $T_F$, set by the manufacturer and variable depending on the materials. In practice, it is always very difficult to know with accuracy the heat treatment that a fibre has undergone (temperature level, time) during its elaboration, this information being confidential for the manufacturer. It is for this reason that it is preferable to carry out a heat treatment of the carbon fibre before using it at high temperature;
 the temperature of use $T_U$ reached during the use of the sensor;
 the temperature reached during the calibration of the sensor $T_E$. By definition, this temperature must be higher than the temperature of use, in other words $T_E>T_U$.

It is also necessary to consider the temperature $T_D$ reached by the carbon fibre during the deposition of the electrical insulation. The deposition temperature will depend on the material deposited.

Consequently,
 to assure the thermochemical stability of the fibre during the deposition of an insulating coating on said carbon fibre, the fibre must be treated beforehand at a temperature $T_1$ higher than the deposition temperature of the coating: $T_1>T_D$;
 to assure the thermochemical stability of the sensor, the sensor must be treated at a temperature $T_2$ higher than the calibration temperature: $T_2>T_E$;
 to prevent any thermomechanical effects between the fibre and the deposition of an insulating coating during rises in temperature, it is desirable that the temperature $T_1$ is higher than the temperature $T_2$: $T_1>T_2$.

The following relation is thus obtained:

$$T_1>T_2>T_E>T_U.$$

In the case of a temperature measurement at the contact of an electrically conductive sample material, the manufacture of the sensor consists firstly in carrying out a heat treatment of the carbon fibre at temperature $T_1$ to assure its stability, then coating it with an electrically insulating deposition, and finally carrying out a second heat treatment at temperature $T_2$ in order to assure the stability of the assembly consisting of the fibre and the insulating layer.

The heat treatments of the sensor during its formation are carried out, at very high temperature, by heating by Joule effect the fibre or the fibre coated with insulator of the sensor, while at the same time simultaneously controlling its temperature by means of a bichromatic pyrometer. The heating by Joule effect is obtained by connecting the sensor (fibre or fibre coated with insulating deposition) to an electrical current supply. During the heat treatments of the sensor, the sensor is placed under secondary vacuum (for example at a pressure from $10^{-5}$ to $10^{-8}$ mbar) in order to avoid its oxidation. The calibration of the sensor carried out at very high temperature is also done by heating by Joule effect.

The heat treatments of the sensor are carried out, at high temperature, by heating the fibre in a resistive oven.

The deposition of silicon carbide is carried out by the chemical vapour deposition technique. To do this, TMS, the liquid precursor retained, is vaporised at room temperature, then swept along up to the deposition chamber under controlled $H_2$ atmosphere. The stoichiometry of the SiC deposited may be adjusted by modifying the flow rates of TMS and $H_2$. During the CVD, the fibre is heated by Joule effect in order to guarantee a uniform deposition of silicon carbide over the entire surface of the fibre.

The deposition of boron nitride is carried out by the chemical vapour deposition technique. To do this, TDMAB, the liquid precursor chosen, is vaporised at 35° C. then swept along by $H_2$ up to the CVD deposition chamber in which it is mixed with $NH_3$. The $NH_3$ makes it possible to assure the stoichiometry of the boron nitride deposited. As previously, the localised heating by Joule effect on the fibre assures a uniform deposition along the whole sensor.

Once formed, the sensor may be calibrated. To do this, the function $F_E$ linking the temperature $T_C(K)$ of the sensor to its electrical resistance $R_C(\Omega)$ is experimentally determined according to the following relation, $R_C=F_E(T_C)$, by slowly heating the sensor in a uniform manner (according to a temperature ramp) and by simultaneously measuring its temperature $T_C$ and its electrical resistance $R_C$. It is important that the temperature of the sensor (and in particular of the fibre) is uniform, on penalty not only of bringing about a variation in the electrical resistance $R_C$ along the fibre and finally degrading the uncertainty of the measurement.

The calibration of the sensor is achieved by progressively heating the sensor by Joule effect in a uniform manner (temperature ramp), under secondary vacuum or sweeping with neutral gas, and by simultaneously measuring its surface temperature $T_C$ and its electrical resistance $R_C$. Since the electrical resistivity of the carbon fibre is relatively high, the thermal conductivity of the sensor generally does not exceed several tens of $W \cdot m^{-1} \cdot K^{-1}$. Consequently, the temperature profile along the sensor is uniform and the electrical resistance may be measured without taking any particular precautions, by simply connecting to its ends.

Given that the surface temperature is measured with more or less efficient measurement means depending on the temperature range, the calibration method has to be adapted as a function of the targeted temperature field, in order to link up the experiment to the most reliable temperature reference, while taking into account the economic and technological constraints of the laboratory. Thus, a distinction is made between:
 calibration at high temperature from 20° C. to 800-1500° C., for which it is desirable to use a thermoelectric couple as means of measuring the surface temperature of the sensor and calibration at very high temperature, in other words for a temperature extending beyond 1500° C., for which it is desirable to use an optical pyrometer as means of measuring the surface temperature of the sensor.

In practice, if the calibration temperature is less than 1000° C., a calibration is carried out by using a thermoelectric couple and if the calibration temperature is higher than 1000° C., an optical pyrometer is used.

For a calibration at high temperature (less than 1000° C.), the sensor is arranged between two blocks of material having a high thermal conductivity and being stable up to the calibration temperature $T_E$. Since the blocks are good thermal conductors, they are consequently virtually isothermal and are going to heat the sensor in a uniform manner. The sensor may for example be maintained between two blocks of carbon.

A thermoelectric couple is inserted into one of the two masses and measures the temperature of the block. Since the mass is a good conductor (several tens of $W \cdot m^{-1} \cdot K^{-1}$), its temperature will be uniform and not very different to that of the sensor. The assembly is placed in an oven under secondary vacuum (pressure from $10^{-5}$ to $10^{-8}$ mbar) or sweeping by an inert gas.

The calibration operation then consists in recording the electrical resistance $R_C$ of the sensor for each temperature $T_C$ value indicated by the thermoelectric couple. The calibration function $F_E$ of the sensor is deduced from this.

The calibration of the sensor presupposes that the temperature field is uniform on the fibre, in order to assure a constant electrical resistance along the fibre. A calibration of the sensor from 20° C. to 1000° C. may thus be carried out.

For a calibration at very high temperature (higher than 1500° C. and in practice, also for a temperature higher than 1000° C.), the sensor is heated by Joule effect, using the same set up as that used for the manufacture of the sensor (see above), and its electrical resistance $R_C$ is recorded for each temperature $T_C$ value indicated by the optical pyrometer. The calibration function $F_E$ of the sensor is deduced from this.

It is also possible to obtain an approximate calibration for a temperature range lower than the minimum temperature that can be measured by the pyrometer. Indeed, at each temperature $T_C$, the thermal equilibrium of the sensor is established by considering on the one hand the heat source due to the Joule effect in the fibre and on the other hand the radiative losses at the surface of the sensor, it being virtually isothermal. An analytical formulation of the thermal problem then leads to a linear relation between $\sigma_B T_C^4$ (where $\sigma_B = 5.67 \cdot 10^{-8}$ $W \cdot m^{-2} \cdot K^{-4}$ is Boltzmann's constant) and $P_C = R_C I_C^2$ (where $I_C$ is the current in the fibre). This relation, defined in the operating range of the pyrometer, may be extrapolated for lower temperatures $T_C$. A calibration function $F_E$ is then directly deduced from this. A calibration of the sensor from 225° C. to 1525° C. for example may thus be carried out.

Once it has been calibrated, the sensor may be used to measure the temperature of materials. To do this, the resistance $R_C$ of the sensor is measured to deduce from it its temperature $T_C$ via its calibration function $F_E$. As during the calibration, it is important that, while the sensor is being used, the sensor has a uniform temperature, under penalty of bringing about a variation in the electrical resistance $R_C$ along the sensor and finally degrading the measurement uncertainty.

The stability of a sensor according to the invention, consisting of an XN05 fibre covered with a layer of boron nitride, has been tested by placing the sensor between two blocks of carbon in an oven and by measuring the temperature by means of a thermoelectric couple (principle of calibration at high temperature (below 1000° C.)). The experiment was carried out on a XN05/BN sensor because the temperature level reached was not sufficiently high to risk a degradation of the electrical insulation due to the diffusion of carbon into the boron nitride.

Figure 3:
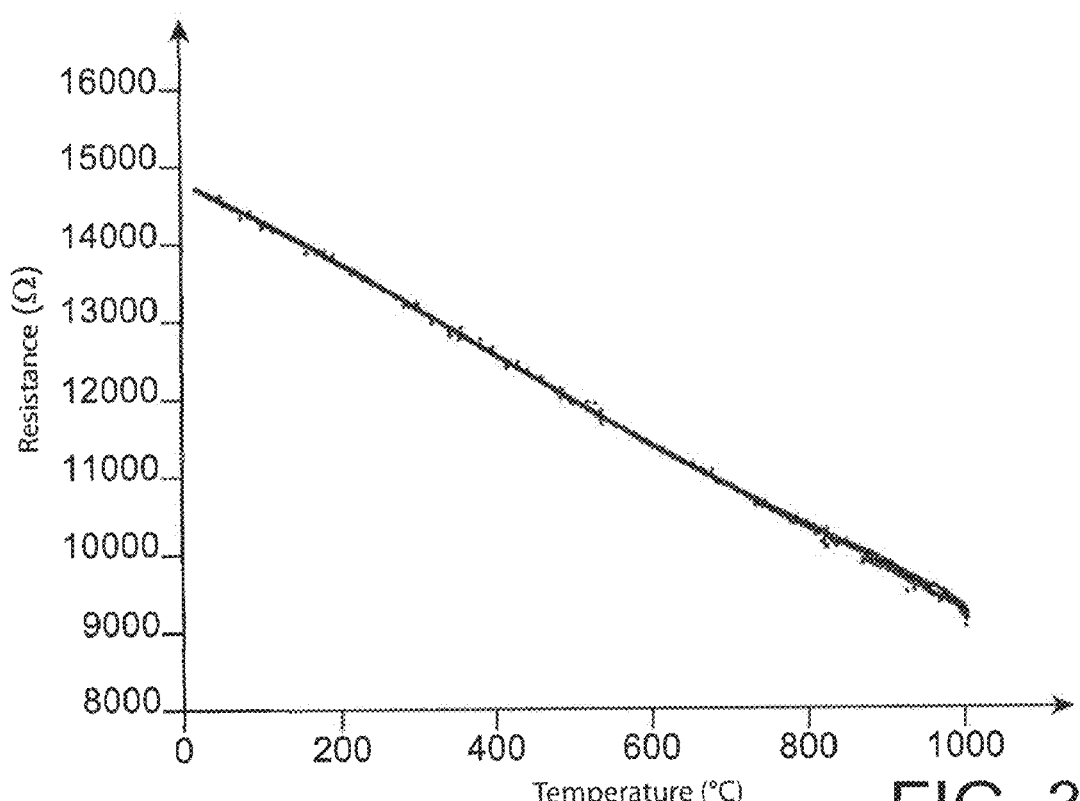
FIG. 3 represents a graph of the resistance of a sensor according to the invention as a function of temperature.

The results of the test are illustrated in FIG. 3 in which are plotted three series of measurements of the electrical resistance as a function of temperature, from 20° C. to 1000° C. The results obtained show the repetitiveness of the measurement.

According to another example, a sensor consisting of an XN05 fibre covered with a layer of SiC and a layer of BN has been formed and calibrated at high temperature up to 1200° C. by placing the sensor between two blocks of carbon, placing the assembly in an oven and measuring the temperature by means of a thermoelectric couple.

Figure 4:
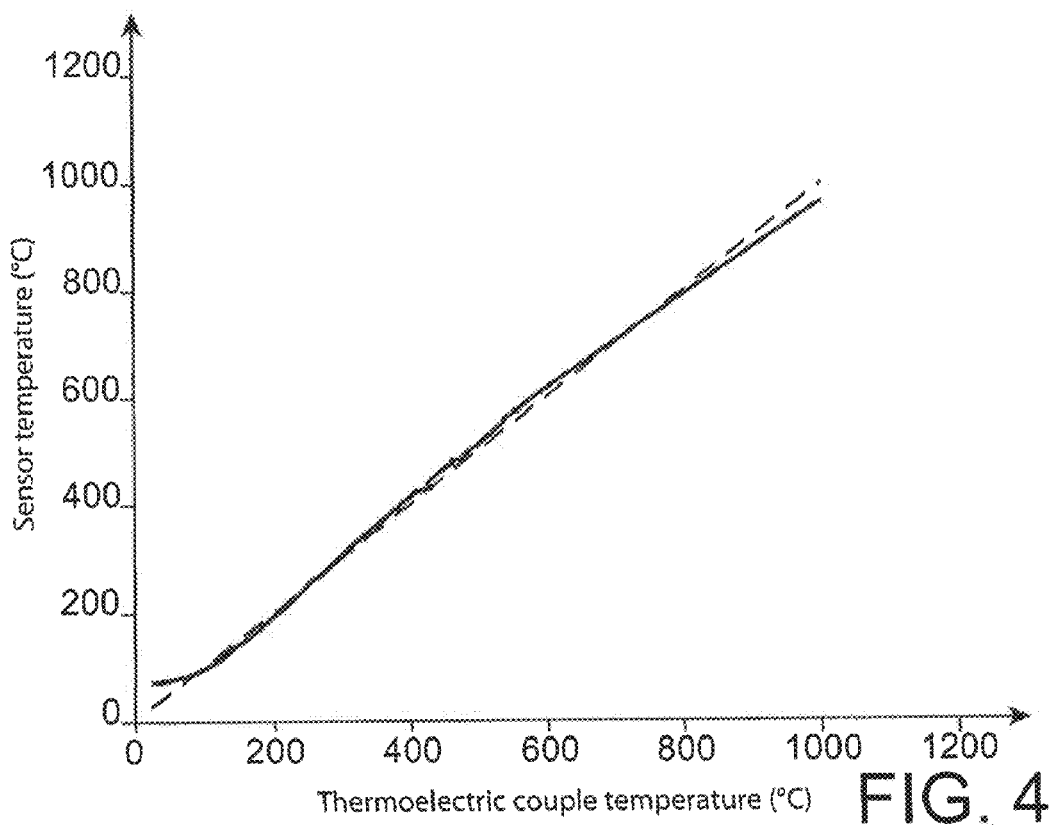
FIG. 4 represents a graph of the temperature measured by means of a sensor according to the invention as a function of the temperature measured, at the same spot, by means of a thermoelectric couple.

The reliability of the measurements obtained thanks to the sensor according to the invention has been tested. To do this, the temperature of a block of alumina is measured by means of two measurement means: the sensor according to the invention on the one hand and a thermoelectric couple on the other hand. The sensor and the thermocouple according to the invention are placed between two blocks of alumina that are placed in an oven. By plotting the temperature measured by the sensor as a function of that measured by the thermoelectric couple, a satisfactory concordance of the results is observed (see FIG. 4). In this FIG. 4, the solid line curve represents the measurement obtained by means of the sensor according to the invention and the dashed line represents the variation that should have been obtained in the case of a "perfect" sensor, for which the measured temperature would have been equal to the reference temperature of the thermoelectric couple. The small difference between the curve and the straight line makes it possible to show that the sensor according to the invention is efficient in terms of exactness of the measurements compared to a thermoelectric couple.

Although the sensors according to the invention can be used at room temperature, the industrial applications of these sensors mainly concern the field of very high temperatures for which no reliable contact measurement sensor exists. The sectors concerned mainly come under aeronautics (braking, motors, turbines, nozzles) and space (atmospheric re-entry). They can also concern certain energy production procedures under development, such as controlled fusion reactors or fourth generation fission nuclear power plants. In other words, the sensor according to the invention may be used in any application field where the problem of the dimensioning of structures at high temperature is a major concern.

Furthermore, one of the advantages of the sensor according to the invention is that, since carbon fibres are elementary constituents of numerous composite materials, it can not only serve as measurement sensor in being inserted between the pieces of materials to be measured, but it can also be directly integrated into the materials to be measured during the manufacture of these materials, thereby forming part of the structure of the materials and also making it possible to carry out in situ measurements, in phase of use, without altering the performance of the materials.

Bibliography

[1] J. ROGEZ, J. LE COZE, Mesure des températures, Techniques de l'Ingénieur (Measuring temperatures, Techniques of the Engineer), volume RC2, 1992, number R2515.

[2] G. BONNIER, H. RONSIN, Thermistances et autres thermomètres a semi-conducteurs, Techniques de l'Ingénieur (Thermistors and other semi-conductor thermometers, Techniques of the Engineer), volume RC3, 1991, number R2580.

[3] C. LORETTE et al., Deposition and characterization of Hex-BN coating on carbon fibres using tris(dimethylamino) borane precursor, J. Eur. Ceram. Soc. (2006).

The invention claimed is:

1. A method for manufacturing a contact temperature sensor to be used at a temperature of use $T_U$, the sensor to withstand a temperature higher than 800° C., the method comprising:
   supply of a carbon fiber of length L and of micrometric diameter;
   heat treatment of the fiber at a temperature $T_1$ higher than 800° C. and higher than the temperature $T_U$ of use of the sensor;
   full layer deposition on the fiber, at a deposition temperature $T_D$, of a coating layer of electrically insulating ceramic material and stable at the temperature of use $T_U$ of the sensor, the ceramic material being chosen among silica ($SiO_2$), zirconia ($ZrO_2$), or alumina ($Al_2O_3$); and
   heat treatment of the fiber, coated with the coating layer, at a temperature $T_2$ higher than the deposition temperature $T_D$ of the coating layer and higher than the temperature of use $T_U$ of the sensor.

2. A manufacturing method according to claim 1, wherein the temperature $T_1$ and the temperature $T_2$ are higher than a calibration limit temperature $T_E$, the calibration limit temperature $T_E$ being higher than the temperature $T_U$ of use of the sensor.

3. A manufacturing method according to claim 1, wherein the temperature $T_1$ is higher than the temperature $T_2$.

4. A method for calibrating the sensor obtained according to claim 1, comprising:
   uniform heating of the sensor according to a temperature ramp by passing an electrical current in the fiber of the sensor until a calibration limit temperature $T_E$ is attained; and
   simultaneous measurement of temperature and resistance of the fiber of the sensor by a measurement device to determine calibration function $F_E$ linking the temperature $T_C(K)$ of the sensor to its electrical resistance $R_C(\Omega)$ according to the formula $RC(\Omega)=F_E \cdot T_C(K)$, the calibration temperature $T_E$ being higher than the temperature of use of the sensor and lower than the heat treatment temperatures $T_1$ and $T_2$.

5. A method for measuring temperature of a material to be tested by a contact temperature sensor, comprising:
   bringing the fiber of the sensor into contact with a surface of the material to be tested;
   heating the fiber of the sensor by the material to be tested with which the fiber is in contact; and
   measuring resistance $R_C$ of the fiber to deduce its temperature $T_C$ via calibration function $F_E$ of the sensor determined according to the calibration method of claim 4.

6. An element of a solid material, comprising a sensor obtained according to claim 1, ends of the sensor being accessible from an exterior of the element to connect the sensor to an electrical power source.

7. A method for manufacturing a contact temperature sensor to be used at a temperature of use $T_U$, the sensor to withstand a temperature higher than 800° C., the method comprising:
   supply of a carbon fiber of length L and of micrometric diameter;
   heat treatment of the fiber at a temperature $T_1$ higher than 800° C. and higher than the temperature $T_U$ of use of the sensor;
   full layer deposition on the fiber, at a deposition temperature $T_{D1}$, of a first coating layer of silicon carbide;
   full layer deposition on the first coating layer, at a deposition temperature $T_{D2}$, of a second coating layer of boron nitride; and
   heat treatment of the fiber thereby obtained at a temperature $T_2$ above the deposition temperatures $T_{D1}$ and $T_{D2}$ and the temperature of use $T_U$ of the sensor.

8. A manufacturing method according to claim 7, wherein the temperature $T_1$ and the temperature $T_2$ are higher than a calibration limit temperature $T_E$, the calibration limit temperature $T_E$ being higher than the temperature $T_U$ of use of the sensor.

9. A manufacturing method according to claim 7, wherein the temperature $T_1$ is higher than the temperature $T_2$.

10. A method for calibrating the sensor obtained according to claim 7, comprising:
    uniform heating of the sensor according to a temperature ramp by passing an electrical current in the fiber of the sensor until a calibration limit temperature $T_E$ is attained; and
    simultaneous measurement of temperature and resistance of the fiber of the sensor by a measurement device to determine calibration function $F_E$ linking the temperature $T_C(K)$ of the sensor to its electrical resistance $R_C(\Omega)$ according to the formula $R_C(\Omega)=F_E \cdot T_C(K)$, the calibration temperature $T_E$ being higher than the temperature of use of the sensor and lower than the heat treatment temperatures $T_1$ and $T_2$.

11. A method for measuring temperature of a material to be tested by a contact temperature sensor, comprising:
    bringing the fiber of the sensor into contact with a surface of the material to be tested;
    heating the fiber of the sensor by the material to be tested with which the fiber is in contact; and
    measuring resistance $R_C$ of the fiber to deduce its temperature $T_C$ via calibration function $F_E$ of the sensor determined according to the calibration method of claim 10.

12. An element of a solid material, comprising a sensor obtained according to claim 7, ends of the sensor being accessible from an exterior of the element to connect the sensor to an electrical power source.

* * * * *